US010007497B2

(12) United States Patent
Eltsin et al.

(10) Patent No.: US 10,007,497 B2
(45) Date of Patent: Jun. 26, 2018

(54) BINARY TRANSLATION ON SHARED OBJECT LEVEL (71) Applicant: Google Inc., Mountain View, CA (US)

(72) Inventors: Evgeny Eltsin, Moscow (RU); Nikolay Igotti, St. Petersburg (RU); Andrey Khalyavin, Moscow Oblast (RU); Dmitry Polukhin, Moscow Oblast (RU)

(73) Assignee: GOOGLE LLC, Mountain View, CA (US)

( * ) Notice: Subject to any disclaimer, the term of this patent is extended or adjusted under 35 U.S.C. 154(b) by 36 days.

(21) Appl. No.: 14/915,207

(22) PCT Filed: Apr. 10, 2015

(86) PCT No.: PCT/IB2015/000937
§ 371 (c)(1),
(2) Date: Feb. 26, 2016

(87) PCT Pub. No.: WO2016/162721
PCT Pub. Date: Oct. 13, 2016

(65) Prior Publication Data
US 2017/0039050 A1 Feb. 9, 2017

(51) Int. Cl.
G06F 9/50 (2006.01)
G06F 9/455 (2018.01)
(Continued)

(52) U.S. Cl.
CPC .................. G06F 8/52 (2013.01); G06F 8/76 (2013.01); G06F 9/44521 (2013.01);
(Continued)

(58) Field of Classification Search
CPC ............. G06F 9/30087; G06F 9/30003; G06F 9/45537; G06F 9/44521; G06F 9/30076;
(Continued)

(56) References Cited

U.S. PATENT DOCUMENTS 6,438,745 B1 * 8/2002 Kanamaru .......... G06F 9/44521
717/137
6,463,582 B1 * 10/2002 Lethin ................. G06F 9/45504
717/138
(Continued)

OTHER PUBLICATIONS

Ding-Yong Hong et al., Efficient and Retargetable Dynamic Binary Translation on Multicores, IEEE vol. 25 No. 3, Mar. 2014, [Retrieved on Jan. 29, 2018]. Retrieved from the internet: <URL: http://ieeexplore.ieee.org/stamp/stamp.jsp?tp= &arnumber=6471968 > 11 Pages (622-632) (Year: 2014).*
(Continued)

Primary Examiner — Anibal Rivera
(74) Attorney, Agent, or Firm — McDermott Will & Emery LLP (57) ABSTRACT Techniques for binary translation are disclosed. A host platform receives a program for a guest platform different from the host. The program uses a set of shared objects or dynamically loaded libraries and is not compatible with the host platform. The host platform determines whether the host platform has a corresponding shared object or dynamically loaded library that implements a common external interface with a specified shared object or dynamically loaded library from within the set. If the host platform has the corresponding shared object or dynamically loaded library, the host platform uses the corresponding shared object or dynamically loaded library in place of the specified shared object or dynamically loaded library for execution of the program. If the host platform lacks the corresponding shared object or dynamically loaded library, the host platform performs binary translation of the specified shared object or dynamically loaded library for execution of the program.

18 Claims, 4 Drawing Sheets (51) Int. Cl.
   *G06F 9/45*   (2006.01)
   *G06F 9/54*   (2006.01)
   *G06F 9/44*   (2018.01)
   *G06F 8/52*   (2018.01)
   *G06F 11/07*  (2006.01)
   *G06F 21/12*  (2013.01)
   *G06F 9/445*  (2018.01)
   *G06F 8/76*   (2018.01)

(52) U.S. Cl.
   CPC ........ *G06F 9/4552* (2013.01); *G06F 11/0712* (2013.01); *G06F 21/125* (2013.01); *G06F 9/45516* (2013.01); *G06F 9/45537* (2013.01)

(58) Field of Classification Search
   CPC ............. G06F 9/45545; G06F 9/45504; G06F 9/4426; G06F 9/45516; G06F 9/45525; G06F 9/4552; G06F 9/3885; G06F 21/125; G06F 8/4432; G06F 8/52; G06F 11/0712; G06F 12/1009; G06F 12/1408; G06F 12/08; G06F 9/45558; G06F 9/30174; G06F 9/5072; G06F 9/45508; G06F 21/565; G06F 21/72; G06F 21/53; G06F 8/41
   See application file for complete search history.

(56) References Cited

U.S. PATENT DOCUMENTS

| | | | | |
|---|---|---|---|---|
| 7,290,253 | B1* | 10/2007 | Agesen | G06F 8/52 711/213 |
| 7,496,494 | B2* | 2/2009 | Altman | G06F 9/45537 703/23 |
| 7,496,495 | B2* | 2/2009 | Solomon | G06F 9/45537 703/23 |
| 7,984,304 | B1* | 7/2011 | Waldspurger | G06F 21/565 713/187 |
| 8,095,773 | B2* | 1/2012 | Greiner | G06F 12/1009 711/207 |
| 8,166,492 | B2* | 4/2012 | Fathalla | G06F 9/45537 717/162 |
| 8,572,606 | B1* | 10/2013 | Agesen | G06F 11/004 718/1 |
| 9,329,887 | B2* | 5/2016 | Brandstatter | G06F 9/45558 |
| 9,495,183 | B2* | 11/2016 | Bond | G06F 9/4552 |
| 2002/0046305 | A1* | 4/2002 | Babaian | G06F 12/109 710/5 |
| 2003/0101334 | A1* | 5/2003 | Desoli | G06F 9/4425 712/227 |
| 2005/0268071 | A1* | 12/2005 | Blandy | G06F 12/08 711/208 |
| 2007/0006178 | A1* | 1/2007 | Tan | G06F 9/45516 717/136 |
| 2007/0016895 | A1* | 1/2007 | Tan | G06F 9/45516 717/136 |
| 2008/0034377 | A1* | 2/2008 | Vo | H04N 9/68 719/320 |
| 2008/0092151 | A1* | 4/2008 | Brown | G06F 9/44521 719/331 |
| 2008/0256564 | A1* | 10/2008 | Fathalla | G06F 9/45537 719/331 |
| 2008/0288941 | A1* | 11/2008 | Adams | G06F 9/45558 718/1 |
| 2009/0113110 | A1* | 4/2009 | Chen | G06F 9/4426 711/6 |
| 2009/0228262 | A1* | 9/2009 | Farrell | G06F 11/0712 703/26 |
| 2009/0271172 | A1* | 10/2009 | Mejdrich | G06F 9/45554 703/26 |
| 2010/0114555 | A1* | 5/2010 | Das | G06F 9/45504 703/26 |
| 2010/0262722 | A1* | 10/2010 | Vauthier | G06F 3/14 710/8 |
| 2010/0274551 | A1* | 10/2010 | Das | G06F 9/45504 703/26 |
| 2010/0281273 | A1* | 11/2010 | Lee | G06F 21/72 713/190 |
| 2011/0307876 | A1* | 12/2011 | Ottoni | G06F 8/441 717/153 |
| 2011/0320661 | A1* | 12/2011 | Heller | G06F 9/30087 710/200 |
| 2012/0260067 | A1* | 10/2012 | Henry | G06F 9/30076 712/200 |
| 2012/0284477 | A1* | 11/2012 | Gainey, Jr. | G06F 9/30003 711/166 |
| 2012/0296626 | A1* | 11/2012 | Bond | G06F 9/4552 703/26 |
| 2013/0080567 | A1* | 3/2013 | Pope | G06F 13/385 709/213 |
| 2013/0080805 | A1* | 3/2013 | Vick | G06F 8/4432 713/320 |
| 2013/0103380 | A1* | 4/2013 | Brandstatter | G06F 9/45558 703/26 |
| 2013/0145375 | A1* | 6/2013 | Kang | G06F 21/53 718/104 |
| 2014/0025893 | A1* | 1/2014 | Brown | G06F 9/30174 711/125 |
| 2014/0089679 | A1* | 3/2014 | Goffmann | G06F 21/125 713/190 |
| 2014/0281376 | A1* | 9/2014 | Yamada | G06F 9/3885 712/28 |
| 2014/0358515 | A1* | 12/2014 | Sreedhar | G06F 9/4552 703/26 |
| 2015/0046924 | A1 | 2/2015 | Ports et al. | |
| 2015/0088982 | A1 | 3/2015 | Johnson et al. | |
| 2015/0089502 | A1* | 3/2015 | Horovitz | G06F 9/45545 718/1 |
| 2015/0100791 | A1* | 4/2015 | Chen | G06F 12/1408 713/189 |
| 2015/0355946 | A1* | 12/2015 | Kang | G06F 9/5072 718/104 |
| 2015/0379169 | A1* | 12/2015 | Wu | G06F 9/45508 703/26 |
| 2016/0344745 | A1* | 11/2016 | Johnson | H04L 67/34 |

OTHER PUBLICATIONS

Keith Adams et al., A Comparison of Software and Hardware Techniques for x86 Virtualization, ACM Oct. 21-25, 2006, [ Retrieved on Jan. 29, 2018]. Retrieved from the internet: <URL: https://dl.acm.org/citation.cfm?id=1168860 > 12 Pages (2-13) (Year: 2006).*

* cited by examiner

BINARY TRANSLATION ON SHARED OBJECT LEVEL

CROSS REFERENCE TO RELATED APPLICATION

This application is related to International Patent Application No. PCT/IB2015/000883 filed on Apr. 10, 2015, and entitled, "BINARY TRANSLATION INTO NATIVE CLIENT," the entire disclosure of which is incorporated herein by reference.

BACKGROUND

The subject technology is generally directed to binary translation techniques. A software program is usually compiled for a specified platform, which may include a specified hardware architecture, a specified operating system, and/or specified libraries. A user may desire to run this software program on another platform different from the specified platform, which has a different hardware architecture, a different operating system or different libraries. In such case, the platform for which the program is compiled is referred to as the guest, and platform on which the code is to be executed is referred to as the host. In order to adjust the program for execution on the host platform, the host platform may be programmed to emulate (in software) the specified guest platform, and a binary translation may be performed to translate the software program from its original form into a new software program that can run on the host platform with the emulated specified guest platform. In binary translation, binary code for the specified guest platform is translated into binary code for the host platform.

SUMMARY

According to some aspects, the subject technology relates to a method. The method includes receiving, at a host platform, a software program written for a specified guest platform different from the host platform, wherein the software program uses a set of shared objects or dynamically loaded libraries, and wherein the software program is not compatible with the host platform. The method includes emulating the specified guest platform within the host platform. The method includes determining whether the host platform has a corresponding shared object or dynamically loaded library, wherein the corresponding shared object or dynamically loaded library implements a common external interface with a specified shared object or dynamically loaded library from within the set of shared objects or dynamically loaded libraries. The method includes, if the host platform has the corresponding shared object or dynamically loaded library, using the corresponding shared object or dynamically loaded library in place of the specified shared object or dynamically loaded library for execution of the software program within the host platform. The method includes, if the host platform lacks the corresponding shared object or dynamically loaded library, performing a binary translation of the specified shared object or dynamically loaded library for execution of the software program within the host platform.

According to some aspects, the subject technology relates to a non-transitory computer-readable medium storing instructions and data. The instructions include code for receiving, at a host platform, a software program written for a specified guest platform different from the host platform, wherein the software program uses a set of shared objects or dynamically loaded libraries, and wherein the software program is not compatible with the host platform. The instructions include code for determining whether the host platform has a corresponding shared object or dynamically loaded library, wherein the corresponding shared object or dynamically loaded library implements a common external interface with a specified shared object or dynamically loaded library from within the set of shared objects or dynamically loaded libraries. The instructions include code for, if the host platform has the corresponding shared object or dynamically loaded library, using the corresponding shared object or dynamically loaded library in place of the specified shared object or dynamically loaded library for execution of the software program within the host platform. The instructions include code for, if the host platform lacks the corresponding shared object or dynamically loaded library, performing a binary translation of the specified shared object or dynamically loaded library for execution of the software program within the host platform.

According to some aspects, the subject technology relates to a system. The system includes one or more processors and a memory storing instructions and data. The instructions include code for receiving, at a host platform, a software program written for a specified guest platform different from the host platform, wherein the software program uses a set of shared objects or dynamically loaded libraries, and wherein the software program is not compatible with the host platform. The instructions include code for emulating the specified guest platform within the host platform. The instructions include code for determining whether the host platform has a corresponding shared object or dynamically loaded library, wherein the corresponding shared object or dynamically loaded library implements a common external interface with a specified shared object or dynamically loaded library from within the set of shared objects or dynamically loaded libraries. The instructions include code for, if the host platform has the corresponding shared object or dynamically loaded library, using the corresponding shared object or dynamically loaded library in place of the specified shared object or dynamically loaded library for execution of the software program within the host platform by dynamically modifying links in the software program to link to the corresponding shared object or dynamically loaded library in place of the specified shared object or dynamically loaded library. The instructions include code for, if the host platform lacks the corresponding shared object or dynamically loaded library, performing a binary translation of the specified shared object or dynamically loaded library for execution of the software program within the host platform.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject, technology is not limited to the specific details set forth herein and may be practiced without these specific details. In some instances, certain structures and components are shown in block diagram form in order to avoid obscuring the concepts of the subject technology.

As used herein, a "platform" may refer to an environment needed for a piece of software to run. The environment may include a hardware architecture, an operating system, and/or one or more libraries. Example platforms include an Android® operating system on ARM® hardware, a Linux® operating system on x86® hardware, and Native Client running on Chrome OS® on X86® hardware. "Binary translation" may refer to a process to take binary code from one platform and to convert it to binary code for another platform. A "shared object," "shared library" or "dynamic library" may be a file that is intended to be shared or accessed by one or more executable files. The "shared Object," "shared library" or "dynamic library" is linked with executable files or other objects/libraries at load time or at runtime. "Marshalling" may refer to a process of transforming a memory representation of an object from a data format used on one platform to a data format used on another platform. In addition, each of the above terms incorporates its plain and ordinary meaning.

An application may run on a platform. The application may have a main executable file and zero or more dynamic libraries. The dynamic libraries may be application-specific or common. Application-specific dynamic libraries implement application-specific behavior and may be distributed together with the application by the application vendor. Common dynamic libraries implement behavior that may be needed by many different applications (e.g., displaying images on a display unit). Such libraries are usually distributed separately by their own vendors (e.g., the developer of the operating system or the developer of the hardware). In some cases, a common dynamic library may have versions for many different operating systems.

The main executable file and the dynamic libraries, which exist together on a particular operating system, may communicate with one another by making function calls. The main executable file and the dynamic libraries may communicate with the operating system by making system calls.

The main executable file, the dynamic libraries, and the operating system run on particular hardware. The main executable file, the dynamic libraries, and the operating system are pieces of software compiled for this particular hardware, and represented in binary code using the particular hardware's instruction set.

Binary translation may refer to a process that takes binary code from one platform (the guest platform) and converts it to binary code for another platform (the host platform or the target platform). One goal of binary translation is to run applications that were originally compiled for the guest platform on the host platform, without accessing the application's source code and recompiling the source code.

In some cases, called full machine emulation, binary translation is accomplished by taking the original main executable, dynamic libraries, and operating system image and running all of the above on the host hardware. In these cases, binary translation is used to emulate the instruction set of the guest hardware on the host hardware. The benefit of this approach is very precise guest emulation. The drawback is relatively slow performance, as a lot of guest code, including the guest operating system and libraries, has to be binary translated.

In some cases, called system call emulation, binary translation is accomplished by taking the original main executable and dynamic libraries from the guest and running them on a different operating system or different hardware associated with the host. In these cases, the original guest program and its dynamic libraries are binary translated up to guest system calls, and the guest system calls are emulated via host system calls. This approach does not emulate the guest code as precisely as the previous one, but may be more efficient because the original guest operating system is not binary translated. Also, only system calls required by the application may be emulated in the host, greatly decreasing complexity.

The subject technology may include going further. Specifically, the subject technology may include taking the original main executable file and application-specific dynamic libraries from the guest and running them with the common dynamic libraries that are originally from the host. Binary translation is used to emulate function calls to the application-specific dynamic libraries (originally from the guest), system calls to the guest's operating system, and the instruction set of the guest's hardware. Benefits of this approach include that the common dynamic libraries of the guest do not need to be binary translated. Instead, only the function calls that are needed by the original main executable file and the application-specific dynamic libraries are emulated at the host. This approach results in greater efficiency than full machine emulation or system call emulation.

One complexity of the subject technology is emulation of function calls. Function call interfaces may be very different in different platforms. Specifically, different platforms may have different calling conventions, where the phrase "calling convention" may refer to how different platforms pass arguments to functions and get return values from the functions. Different platforms may have different binary representations for data objects, including differences in the data model, and sizes and alignments of different data types. Also, data objects of the same meaning and function may have different internal representations on different platforms. For example, a FILE object is different in GNU C Library (glibc) and Bionic C Library, even if the data model is the same in both glibc and bionic.

This complexity may be addressed by conversion of calling conventions and marshalling of data objects. This may be completed based on known prototypes of the involved functions and the binary layout of the involved data objects. However, in some cases conversion of calling conventions and marshalling of data objects may not be practical. Several solutions, which are described below, may be used in such cases. One solution includes using a same address space and 1:1 pointer mapping for the guest and the host. This avoids marshalling pointers to data objects. Another solution includes providing proxy functions to convert calling conventions from the guest to the host (e.g., "host function wrappers") and from the host to the guest (e.g., "guest function wrappers"). The same address may be used for a host function and its corresponding host function wrapper, to avoid marshalling of pointers to host functions.

Current binary translation schemes include full machine emulation or userland emulation. As used herein, the term "userland" may refer to, for example, user space operating system software that may not belong in a kernel. In full machine emulation, the entire guest machine hardware is emulated, including the software program for guest platform, along with operation system for the guest system. Alternatively, the guest hardware and the operating system associated with the specified guest platform may be emulated using the host platform and the host operating system, and the software program may run on top of this emulation framework. The binary translation schemes described above consume a lot of resources, such as processor time and memory. As the foregoing illustrates, a new technique for binary translation may be desirable.

The subject technology relates to binary translation on a shared object level of a software program being migrated from a specified guest platform to a host platform. The software program is originally compiled for the specified guest platform, different from the host platform. The software program is not compatible with the host platform. The software program uses a set of shared objects or libraries, which include dependencies on system libraries of the specified guest hardware system, and vendor libraries created by the vendor and specific to the software program.

During the binary translation, the specified guest platform is emulated within the host platform. For each object or dynamically loaded library in the set of shared objects or dynamically loaded libraries used by the software program, the binary translator determines whether the host platform has a corresponding shared object or dynamically loaded library that implements a common external interface with the object or dynamically loaded library in the set, if the object is a library, the library may be a system library (which is associated with a corresponding system library/object at the host hardware, where the corresponding library/object has the common external interface with the library) or a vendor library (which may not be associated with a corresponding library/object at the host hardware). An example of a system library may be a library for presenting primitive graphics on a display unit, which exists in almost every platform. An example of a vendor library may be a library created by the vendor of the software program for use exclusively with the software program. The vendor libraries may be provided to the user for download (e.g., via the Internet or via a removable disk, such as a CD or USB disk) when the user purchases or requests the software program for download at a machine implementing the specified guest hardware system.

As used herein, an a "corresponding shared object or dynamically loaded library" exists in a host platform for an original object or dynamically loaded library of the guest platform if the corresponding shared object or dynamically loaded library implements a common external interface with the original object or dynamically loaded library. An original object or dynamically loaded library and a corresponding shared object or dynamically loaded library have a "common external interface" if the original object and the corresponding shared object or dynamically loaded library implement similar or substantially the same function calls and implement similar or substantially the same behavior in response to the function calls.

If the object or dynamically loaded library (e.g., a system library) corresponds to a corresponding shared object or dynamically loaded library at the host hardware, where the corresponding shared object or dynamically loaded library has the same behavior as the object, the binary translator uses the corresponding shared object or dynamically loaded library in place of the object for execution of the software program within the host hardware. The binary translator does not binary translate the specified shared object or dynamically loaded library. The binary translator dynamically resolves dependencies within the first program to link to the corresponding shared object or dynamically loaded library of the host platform in place of the object of the specified guest platform.

Specifically, the binary translator cooperates with dynamic linker mechanisms implementing late binding, and resolves entries for functions in host libraries via specialized trampolines. A trampoline may, for example, perform an application binary interface (ABI) translation and sometimes performs a semantics translation. The trampoline may replace calls to the guest version of the API with calls to the host version of the API. The trampolines may be implemented using custom executable and linkable format (ELF) linker. During load, the ELF linker may insert appropriate trampolines into the import table of the object to be transferred from the guest to the host. Semantic translation may include translation of function pointer APIs, by making them suitable for invocation by the host, or conversion object binary layout for cases where the host and the guest have different requirements, for example, due to alignment or different implementation of system libraries on the guest and the host platforms.

As an example, if the guest code calls the qsort( ) standard library function, the guest code mentions 'qsort' as an unresolved entry in library's import table. During late binding such an entry is filled with the pointer to machine code which does two things: (1) reads arguments from emulated guest registers and stack so that they are visible to the host function; and (2) converts arguments according to the known signature of 'qsort' function. In other words, guest pointers are converted to host pointers, integers are passed as is, and the function pointer argument is wrapped into dynamically generated host code, so that the function pointer argument could be invoked by the host 'qsort' emulation as needed. Wrapping of guest function pointers may include the opposite conversion from host ABI to guest ABI.

As a result, the guest program achieves the same behavior as expected, while performing desired operations using optimized host versions of the function. The comparator function, at the host, is being run using binary translation, while the sorting algorithm itself runs at the native speed.

The external shared object reference in the guest shared object may be resolved either using host shared object, as described above, or using other guest shared objects. In the latter case, no trampoline is required, as caller and callee obey the same ABI. Thus, the custom loader may behave the same way as the standard loader.

Some approaches according to the subject technology ensures that binary translation, which may be slower and more resource-consuming than native execution, is only applied to vendor provided shared objects, for which there is no native host implementation. These approaches are an improvement over other schemes, which involve providing binary translations of both vendor provided libraries and system libraries.

The technique described above requires execution of system libraries of the host platform directly on the hardware of the host platform, and vendor libraries on an emulation of the specified guest platform on the host platform. As a result, a state (e.g., of registers, stack, etc.) of the host platform may need to be synchronized with a state of the emulated specified guest platform. When call to the host function from the guest happens, the emulation layer performs all needed arguments translation, which may include moving of parameters from the emulated guest state to registers and stack or the host hardware, so that host code may act as though it is being invoked normally.

Figure 1A:
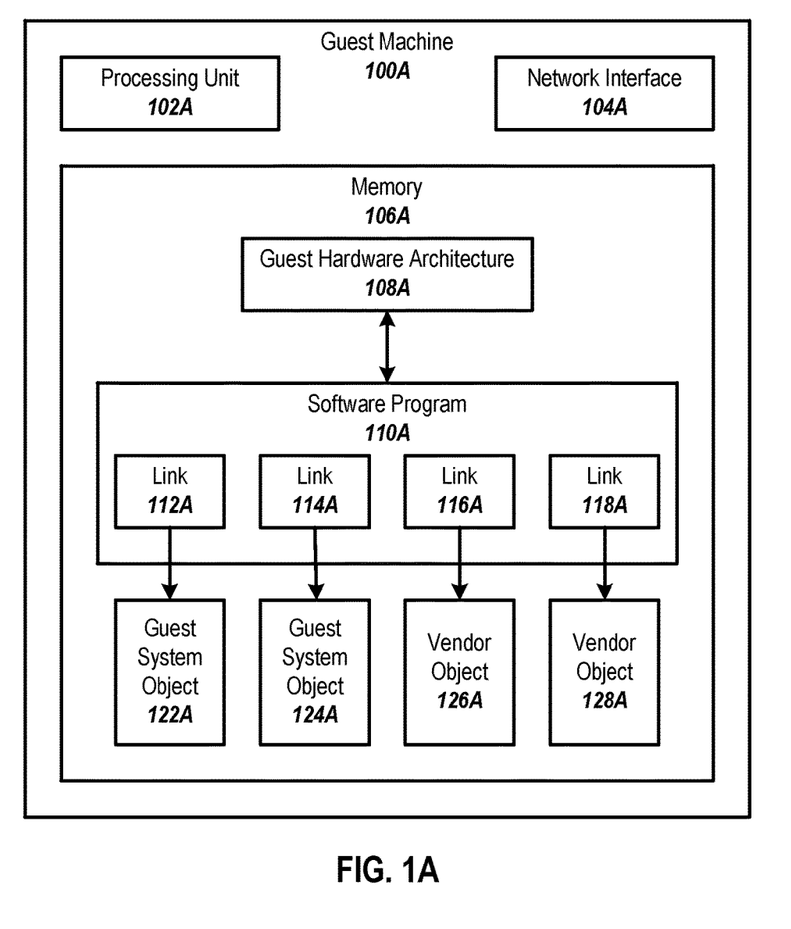
FIG. 1A illustrates an example guest machine which may be involved in binary translation on a shared object level.

FIG. 1A illustrates an example guest machine 100A which may be involved in binary translation on a shared object level. The guest machine 100A may be any computing device, for example, a laptop computer, a desktop computer, a tablet computer, a mobile phone, a personal digital assistant (PDA), an electronic music player, a smart watch, a television coupled with one or more processors and a memory, etc. In some examples, the guest machine 100A has ARM hardware.

As shown, the guest machine 100A includes a processing unit 102A, a network interface 104A, and a memory 106A. The processing unit 102A includes one or more processors. The processing unit 102A may include a central processing unit (CPU), a graphics processing unit (GPU), or any other processing unit. The processing unit 102A executes computer instructions that are stored in a computer-readable medium, for example, the memory 106A. The network interface 104A allows the guest machine 100A to transmit and receive data in a network, for example, the Internet, an intranet, a cellular network, a local area network, a wide area network, a wired network, a wireless network, a virtual private network (VPN), etc. The memory 106A stores data and/or instructions. The memory 106A may be one or more of a cache unit, a storage unit, an internal memory unit, or an external memory unit. As illustrated, the memory 106A includes guest hardware architecture 108A, a software program 110A, guest system objects 122A and 124A, and vendor objects 126A and 128A.

The guest hardware architecture 108A may include any platforms used by the guest machine 100A, for instance, registers or a system stack. The software program 110A uses the guest hardware architecture 108A during its execution. The software program 110A is written for the guest machine 100A and designed to work with the guest hardware architecture 108A present in the guest machine 100A. The software program 110A may be any software program, for example, a word processor, a messaging or email program, an audio or video player, an online or offline gaming program, etc.

As illustrated, the software program 110A includes links 112A, 114A, 116A, and 118A. The links 112A and 114A interface with guest system objects 122A and 124A, respectively. The guest system objects 122A and 124A are objects for which corresponding shared object or dynamically loaded libraries exist in a host machine (e.g., host machine 100B, discussed in conjunction with FIG. 1B, below), where the corresponding shared object or dynamically loaded library implements a common external interface and common behavior with the guest system object 122A or 124A. For example, the guest system object 122A or 124A may correspond to a system library that is implemented in any all or most platforms. Examples of a system library include a graphics library for presenting primitive graphics at a display unit or a sound library for playing sound files at an audio output unit. The links 116A and 118A interface with vendor objects 126A and 128A, respectively.

The vendor objects 126A and 128A are objects for which a corresponding shared object or dynamically loaded libraries does not exist in a host machine (e.g., host machine 100B, discussed in conjunction with FIG. 1B, below), where the corresponding shared object or dynamically loaded library implements a common external interface and common behavior with the vendor object 126A or 128A. For example, the vendor objects 126A and 128A may be provided to the user of the guest machine 100A for download (e.g., via a network or via a removable disk, such as a CD or a USB disk) when the user purchases or requests the software program at the guest machine 100A.

As discussed above, the software program 110A is designed to fun on the guest machine 100A (or another machine with the same platform). The software program 110A is designed to interface with the guest hardware architecture 108A and with the guest system objects 122A and 124A. However, in some cases, it may be desirable to execute the guest software program 110A on a host machine (e.g., host machine 100B discussed in conjunction with FIG. 1B, below) with a platform different from that of the guest machine 100A. In some implementations, the subject technology provides techniques to allow the software program 110A to execute on such a host machine.

Figure 1B:
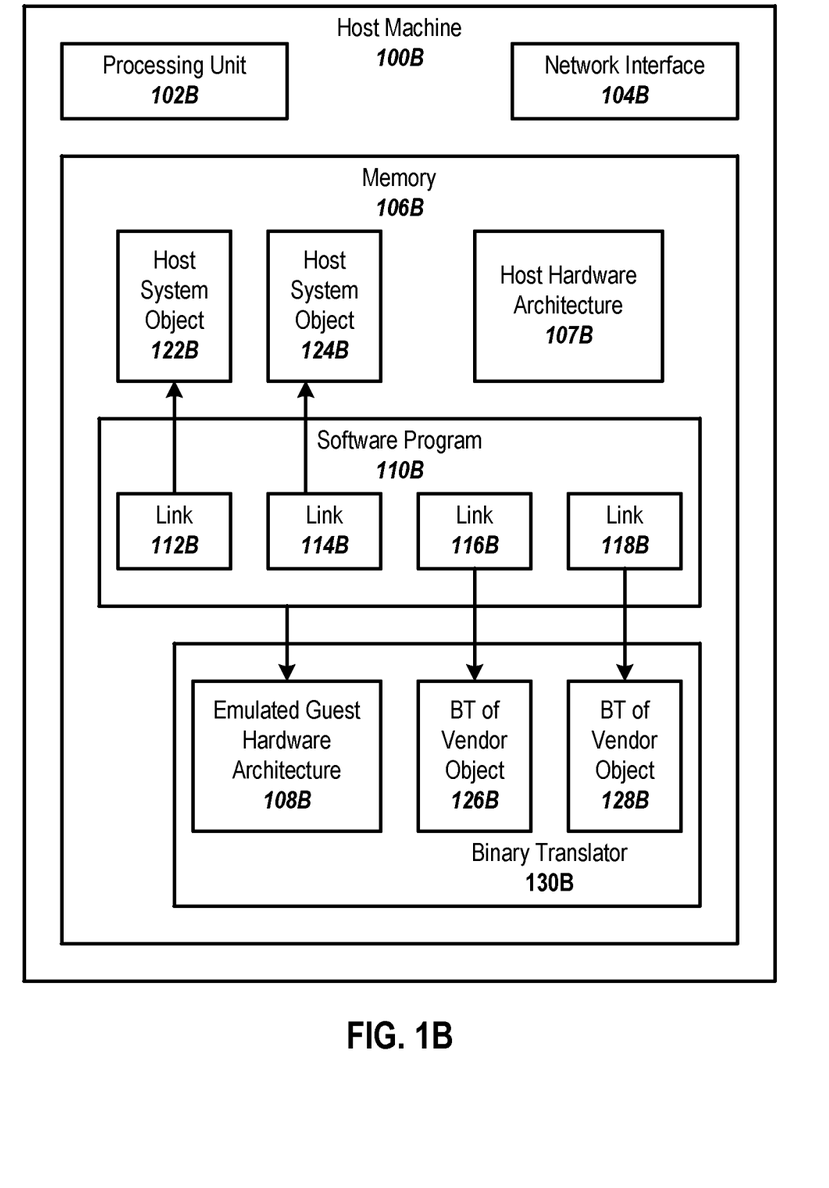
FIG. 1B illustrates an example host machine which may be involved in binary translation on a shared object level.

FIG. 1B illustrates an example host machine 100B which may be involved in binary translation on a shared object level. The host machine 100B may be any computing device, for example, a laptop computer, a desktop computer, a tablet computer, a mobile phone, a personal digital assistant (PDA), an electronic music player, a smart watch, a television coupled with one or more processors and a memory, etc. The host machine 100B has a platform different from the platform of the guest machine 100A. For example, if the platform of the guest machine 100A is ARM hardware, the platform of the host machine 100B is not ARM hardware and may be, for example, x86 hardware.

As shown, the host machine 100B includes a processing unit 102B, a network interface 104B, and a memory 106B. The processing unit 102B includes one or more processors. The processing unit 102B may include a central processing unit (CPU), a graphics processing unit (GPU), or any other processing unit. The processing unit 102B executes computer instructions that are stored in a computer-readable medium, for example, the memory 106B. The network interface 104B allows the host machine 100B to transmit and receive data in a network, for example, the Internet, an intranet, a cellular network, a local area network, a wide area network, a wired network, a wireless network, a virtual private network (VPN), etc. The memory 106B stores data and/or instructions. The memory 106B may be one or more of a cache unit, a storage unit, an internal memory unit, or an external memory unit. As illustrated, the memory 106B includes host hardware architecture 107B, a software program 110B, host system objects 122B and 124B, and a binary translator 130B, which includes emulated guest hardware architecture 108B and binary translations (BTs) of vendor objects 126B and 128B.

The host hardware architecture 107B may include any platforms used by the host machine 100B, for instance, registers or a system stack. Software written for the host machine 100B may use the host hardware architecture 107B during its execution. The host hardware architecture 107B may not be aware of the existence of the contents of the binary translator 130B the emulated guest hardware architecture 108B and the binary translations of the vendor objects 126B and 128B. Thus, the host platform may not provide an interface for the emulated guest hardware architecture 108B and the binary translations of the vendor objects 126B and 128B to access the host hardware architecture 107B and may operate in its usual manner.

The binary translator 130B generates and stores the emulated guest hardware architecture 108B, which is implemented in software and correspond to the guest hardware architecture 108A in the guest machine 100A. The emulated guest hardware architecture 108B of the host machine 100B have the same functionality and behavior as the guest hardware architecture 108A of the guest machine 100A. For example, if the guest hardware architecture 108A of the guest machine 100A include registers and stacks implemented in hardware, the emulated guest hardware architecture 108B may include registers and stacks with the same functionality and behavior that are implemented in software on top of the hardware of the host machine 100B.

The software program 110B corresponds to the software program 110A of the guest machine 100A. However, the software program 100B is configured to execute at the host machine 100B. The software program 110B interfaces with the emulated guest hardware architecture 108B of the host machine 100B instead of interfacing with the guest hardware architecture 108A of the guest machine 100A. As illustrated, the software program includes links 112B and 114B to host system objects 122B and 124B, respectively. The links 112B and 114B to the host system objects 122B and 124B replace the links 112A and 114A to the guest system objects 112A and 114A of FIG. 1A. The software program includes links 116B and 118B to binary translations of vendor objects 126B and 128B, respectively. As discussed in greater detail in conjunction with FIG. 2, below, the vendor objects 126A and 128A have binary translations performed to obtain the binary translations of the vendor objects 126B and 128B because corresponding shared object or dynamically loaded libraries that have the same external interface, functionality, and behavior as the vendor objects 126A and 128A, do not exist on the host machine 100B. The host system objects 122B and 124B are originally developed for the architecture of the host machine 100B. Similarly, the guest system objects 122A and 124A are originally developed for the architecture of the guest machine 100A.

The link 112B corresponds to the link 112A, and the host system object 122B corresponds to the guest system object 122A. In other words, the host system object 122B implements a common external interface, and has a common functionality and behavior, with the guest system object 122A. As a result, the software program 110B/110A may be adjusted, in the process of porting from the guest machine 100A to the host machine 100B, to link (via link 112B/112A) to the host system object 122B instead of the guest system object 122A.

The link 114B corresponds to the link 114A, and the host system object 124B corresponds to the guest system object 124A. In other words, the host system object 124B implements a common external interface, and has a common functionality and behavior, with the guest system object 124A. As a result, the software program 110B/110A may be adjusted, in the process of porting from the guest machine 100A to the host machine 100B, to link (via link 114B/114A) to the host system object 124B instead of the guest system object 124A.

The link 116B corresponds to the link 116A. Object 126B, generated by the binary translator 130B, is a binary translation of the vendor object 126A of the guest machine 100A. As a result of the binary translation, the object 126B executes on the host machine 100B and implements an external interface, functionality, and behavior similar to that of the vendor object 126A. Thus, the software program 110B may link to the object 126B, within the binary translator 130B, in place of the vendor object 126A.

The link 118B corresponds to the link 118A. Object 128B, generated by the binary translator 130B, is a binary translation of the vendor object 128A of the guest machine 100A. As a result of the binary translation, the object 128B executes on the host machine 100B and implements an external interface, functionality, and behavior similar to that of the vendor object 128A. Thus, the software program 110B may link to the object 128B, within the binary translator 130B, in place of the vendor object 128A.

Importantly, the host hardware architecture 107B may not know about the emulated guest hardware architecture 108B and may work in its usual manner, without providing an interface for the emulated guest hardware architecture 108B. The binary translator 130B hides the emulated guest hardware architecture 108B. The binary translator 130B hides the emulated guest hardware architecture 108B inside of itself and makes the binary translations of the vendor objects 126B and 128B compatible with the expectations of the host machine 100B, such as the ABI of the host machine 100B.

In FIGS. 1A and 1B, the subject technology is described in conjunction with two system objects 122A/122B and 124A/124B and two vendor objects 126A and 128A. However, the subject technology may be implemented with any number (e.g., zero, one, two or more than two) of system objects and any number (e.g., zero, one, two or more than two) of vendor objects.

Figure 2:
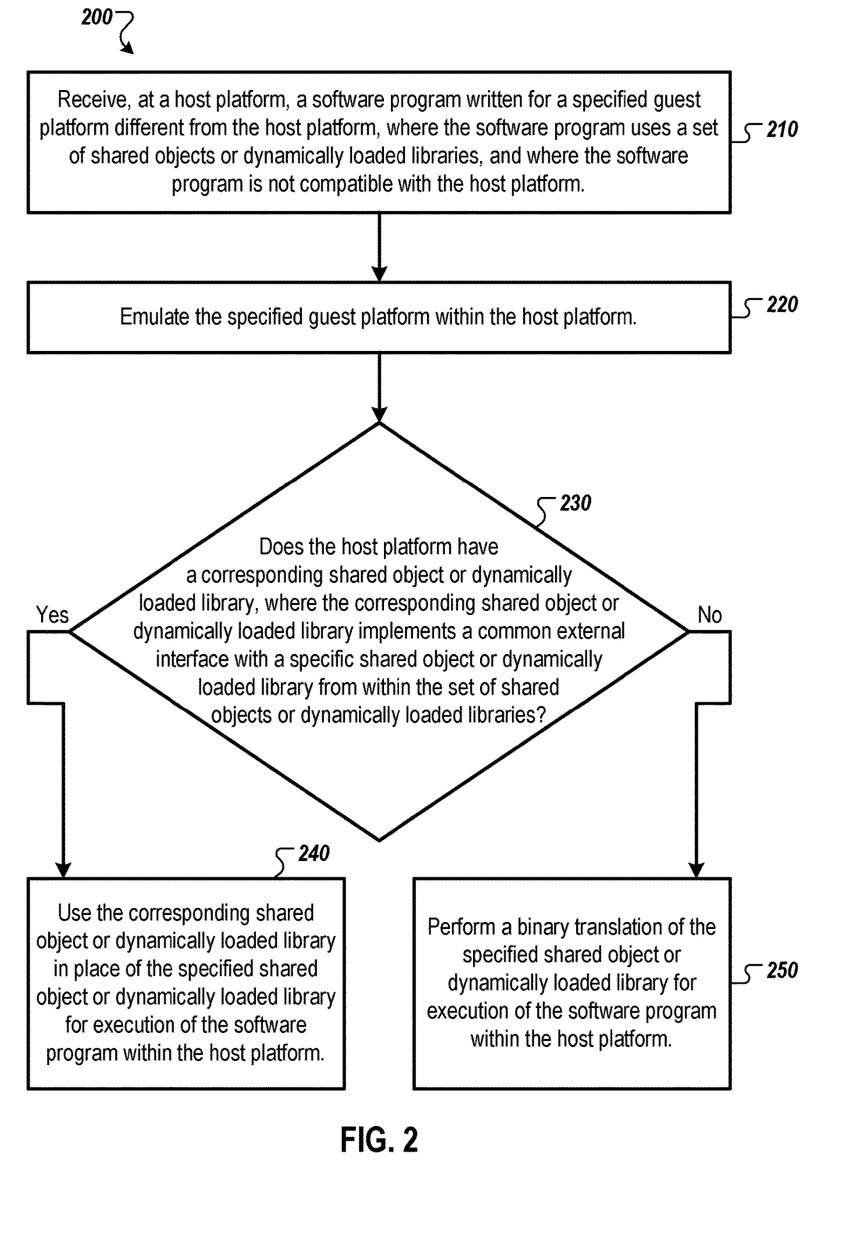
FIG. 2 illustrates an example process by which binary translation on a shared object level may be completed.

FIG. 2 illustrates an example process 200 by which binary translation on a shared object level may be completed.

The process 200 begins at step 210, where a host platform (e.g., host machine 100B) receives a software program (e.g., software program 110A) written for a specified guest platform (e.g., guest machine 100A) different from the host platform. The software program uses a set of shared objects or dynamically loaded libraries (e.g., objects 122A, 124A, 126A, and 128A). The software program is not compatible with the host platform.

In step 220, the host platform emulates the specified guest platform within the host platform. For example, if the guest platforms include registers and a system stack, the host platform may create software emulations of the registers and the system stack of the guest hardware. The software program may operate on the emulated guest platform in place of the original guest platform.

In step 230, the host platform determines whether the host platform has a corresponding shared object or dynamically loaded library, where the corresponding shared object or dynamically loaded library implements a common external interface with a specified shared object or dynamically loaded library from within the set of shared objects or dynamically loaded libraries. The specified shared object or dynamically loaded library may be a guest system object (e.g., guest system object 122A or 124A) that has a corresponding host system object (e.g., host system object 122B or 124B) that implements the common external interface with the guest system object. Alternatively, the specified shared object or dynamically loaded library may be a vendor object (e.g., vendor object 126A or 128A) that may not be associated with such a corresponding host system object. If the host platform has the corresponding shared object or dynamically loaded library, the process 200 continues to step 240. If the host platform lacks the corresponding shared object or dynamically loaded library, the process 200 continues to step 250.

The set of shared objects or dynamically loaded libraries may include a set of libraries. The set of libraries may include at least one system library that is associated with the corresponding shared object or dynamically loaded library for the host platform and at least one vendor library that may not be associated with the corresponding shared object or dynamically loaded library for the host platform.

In step 240, upon determining that the host platform has the corresponding shared object or dynamically loaded library, the host platform uses the corresponding shared object or dynamically loaded library in place of the specified shared object or dynamically loaded library for execution of the software program within the host platform. The host platform may dynamically (e.g., at run time rather than at compile time) modify links in the software program to link to the corresponding shared object or dynamically loaded library in place of the specified shared object or dynamically loaded library. (For example, referring to FIGS. 1A-1B, the link 112B/112A may be dynamically modified to link to the host system object 122B in place of the guest system object 122A.) The host platform may provide a bridge so that calls to the specified shared object or dynamically loaded library are converted to calls to the corresponding shared object or dynamically loaded library. After step 240, the process 200 ends.

In step 250, upon determining that the host platform lacks the corresponding shared object or dynamically loaded library, the host platform performs a binary translation of the specified shared object or dynamically loaded library for execution of the software program within the host platform. Performing the binary translation may include creating a binary translated object, where an external interface of the binary translated object includes a function call to other binary translated vendor objects or system objects of the host platform. In some cases, any instructions in the object that can be executed in the specified guest platform but cannot be executed at the host platform may be translated into instructions that can be executed at the host platform. For example, if the host platform is a 64 register architecture which requires that no instructions crossing register 32 are provided (as is true in some implementations of the x86 architecture), an instruction to access registers 30-35 may be modified to an instruction to access registers 30-31 and an instruction to access registers 32-35. The translation of the code may be done "just in time." In other words, the translation may occur when control is passed from code associated with a system object to code associated with a vendor object, and vice versa. In other words, the translation may occur when a system object stops executing and a vendor object starts executing, or vice versa. One benefit of the "just in time" approach is that code in the software program that is not executed on the host platform is not translated, reducing time and processing resources that are spent on binary translation. After step 250, the process 200 ends.

In some examples, the software program executing at the host platform may receive a call that requires access to a state of the emulated guest platform (e.g., emulated guest hardware architecture 108B) or to a state of the host platform (e.g., host hardware architecture 107B). The host platform may synchronize, in response to the call, the state of the emulated guest platform with the state of the host platform. For example, the host platform may propagate changes that were made to the stack or the registers of the emulated guest platform to the stack or the registers of the host platform, and vice versa. As a result of this synchronization, the call may be processed according to a synchronized state of the emulated guest platform and the host platform. During the synchronization, the emulation layer may perform all needed argument translations, which may include moving of parameters from the emulated guest state to registers and stack or the host hardware, so that host code may act as though it is being invoked normally.

As described above, the steps 210-250 of the process 200 are implemented according to a certain order and in series. However, the steps 210-250 may be implemented in any order. In some examples, two or more of the steps 210-250 may be implemented in parallel.

Figure 3:
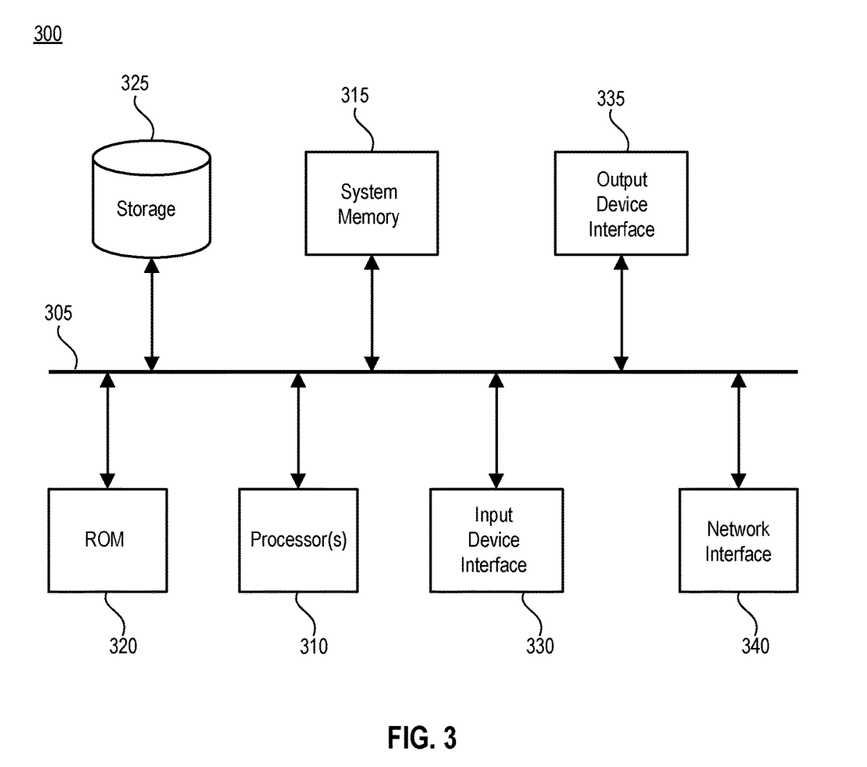
FIG. 3 conceptually illustrates an example electronic system with which some implementations of the subject technology are implemented.

FIG. 3 conceptually illustrates an electronic system 300 with which some implementations of the subject technology are implemented. For example, one or more of the guest machine 100A or the host machine 100B may be implemented using the arrangement of the electronic system 300. The electronic system 300 can be a computer (e.g., a mobile phone, PDA), or any other sort of electronic device. Such an electronic system includes various types of computer readable media and interfaces for various other types of computer readable media. Electronic system 300 includes a bus 305, processor(s) 310, a system memory 315, a read-only memory 320, a permanent storage device 325, an input device interface 330, an output device interface 335, and a network interface 340.

The bus 305 collectively represents all system, peripheral, and chipset buses that communicatively connect the numerous internal devices of the electronic system 300. For instance, the bus 305 communicatively connects the processor(s) 310 with the read-only memory 320, the system memory 315, and the permanent storage device 325.

From these various memory units, the processor(s) 310 retrieves instructions to execute and data to process in order to execute the processes of the subject technology. The processor(s) can include a single processor or a multi-core processor in different implementations.

The read-only-memory (ROM) 320 stores static data and instructions that are needed by the processor(s) 310 and other modules of the electronic system. The permanent storage device 325, on the other hand, is a read-and-write memory device. This device is a non-volatile memory unit that stores instructions and data even when the electronic system 300 is off. Some implementations of the subject technology use a mass-storage device (for example a magnetic or optical disk and its corresponding disk drive) as the permanent storage device 325.

Other implementations use a removable storage device (for example a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the processes of the subject technology are stored in the system memory 315, the permanent storage device 325, or the read-only memory 320. For example, the various memory units include instructions for binary translation on a shared object level in accordance with some implementations. From these various memory units, the processor(s) 310 retrieves instructions to execute and data to process in order to execute the processes of some implementations.

The bus 305 also connects to the input and output device interfaces 330 and 335. The input device interface 330 enables the user to communicate information and select commands to the electronic system. Input devices used with input device interface 330 include, for example, alphanumeric keyboards and pointing devices (also called "cursor control devices"). Output device interfaces 335 enables, for example, the display of images generated by the electronic system 300. Output devices used with output device interface 335 include, for example, printers and display devices, for example cathode ray tubes (CRT) or liquid crystal displays (LCD). Some implementations include devices for example a touch screen that functions as both input and output devices.

Finally, as shown in FIG. 3, bus 305 also couples electronic system 300 to a network (not shown) through a network interface 340. In this manner, the electronic system 300 can be a part of a network of computers (for example a local area network (LAN), a wide area network (WAN), or an Intranet, or a network of networks, for example the Internet. Any or all components of electronic system 300 can be used in conjunction with the subject technology.

The above-described features and applications can be implemented as software processes that are specified as a set of instructions recorded on a computer readable storage medium (also referred to as computer readable medium). When these instructions are executed by one or more processor(s) (which may include, for example, one or more processors, cores of processors, or other processing units), they cause the processor(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processor and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa.

A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method comprising:
   receiving, at a host platform, a software program written for a specified guest platform different from the host platform, wherein the software program uses a set of shared objects or dynamically loaded libraries associated with the quest platform and wherein the software program and the set of shared objects or dynamically loaded libraries are not compatible with the host platform;
   emulating the specified guest platform within the host platform;
   determining whether the host platform has a corresponding shared object or dynamically loaded library that was not binary translated from, but implements a common external interface with a specified shared object or dynamically loaded library from within the set of shared objects or dynamically loaded libraries;
   if the host platform has the corresponding shared object or dynamically loaded library, using the corresponding shared object or dynamically loaded library based on modifying one or more links in the software program to link to the corresponding shared object or dynamically loaded library in place of the specified shared object or dynamically loaded library for execution of the software program within the host platform, avoiding a binary translation of the specified shared object or dynamically loaded library, wherein the common external interface implements similar or substantially the same function calls, and similar or substantially the same behavior in response to the function calls, as the specified shared object or dynamically loaded library; and
   if the host platform lacks the corresponding shared object or dynamically loaded library, performing the binary translation of the specified shared object or dynamically loaded library for execution of the software program within the host platform.

2. The method of claim 1, wherein performing the binary translation of the specified shared object or dynamically loaded library comprises creating a first binary translated object, wherein an external interface of the first binary translated object comprises a function call to a second binary translated object for the host platform or to an object originally for the host platform.

3. The method of claim 1, wherein the set of shared objects or dynamically loaded libraries comprises at least one system library that is associated with the corresponding shared object or dynamically loaded library at the host platform and at least one vendor library that is not associated with the corresponding shared object or dynamically loaded library at the host platform.

4. The method of claim 1, wherein the specified guest platform comprises ARM hardware, and wherein the host platform comprises x86 hardware.

5. The method of claim 1, wherein using the corresponding shared object or dynamically loaded library in place of the specified shared object or dynamically loaded library for execution of the software program within the host platform comprises:

providing a bridge so that calls to the specified shared object or dynamically loaded library are converted to calls to the corresponding shared object or dynamically loaded library.

6. The method of claim 1, further comprising:
receiving a call that requires access to a state of the emulated guest platform or to a state of the host platform; and
synchronizing, in response to the call, the state of the emulated guest platform with the state of the host platform.

7. A non-transitory computer-readable medium comprising instructions which, when executed by one or more computers, cause the one or more computers to implement a method, the method comprising:
receiving, at a host platform, a software program written for a specified guest platform different from the host platform, wherein the software program uses a set of shared objects or dynamically loaded libraries associated with the quest platform, and wherein the software program and the set of shared objects or dynamically loaded libraries are not compatible with the host platform;
determining whether the host platform has a corresponding shared object or dynamically loaded library that was not binary translated from, but implements a common external interface with a specified shared object or dynamically loaded library from within the set of shared objects or dynamically loaded libraries;
if the host platform has the corresponding shared object or dynamically loaded library, using the corresponding shared object or dynamically loaded library based on modifying one or more links in the software program to link to the corresponding shared object or dynamically loaded library in place of the specified shared object or dynamically loaded library for execution of the software program within the host platform, avoiding a binary translation of the specified shared object or dynamically loaded library, wherein the common external interface implements similar or substantially the same function calls, and similar or substantially the same behavior in response to the function calls, as the specified shared object or dynamically loaded library; and
if the host platform lacks the corresponding shared object or dynamically loaded library, performing the binary translation of the specified shared object or dynamically loaded library for execution of the software program within the host platform.

8. The non-transitory computer-readable medium of claim 7, wherein performing the binary translation of the specified shared object or dynamically loaded library comprises creating a first binary translated object, wherein an external interface of the first binary translated object comprises a function call to a second binary translated object for the host platform or to an object originally for the host platform.

9. The non-transitory computer-readable medium of claim 7, wherein the set of shared objects or dynamically loaded libraries comprises at least one system library that is associated with the corresponding shared object or dynamically loaded library at the host platform and at least one vendor library that is not associated with the corresponding shared object or dynamically loaded library at the host platform.

10. The non-transitory computer-readable medium of claim 7, wherein the specified guest platform comprises ARM hardware, and wherein the host platform comprises x86 hardware.

11. The non-transitory computer-readable medium of claim 7, wherein using the corresponding shared object or dynamically loaded library in place of the specified shared object or dynamically loaded library for execution of the software program within the host platform comprises:
providing a bridge so that calls to the specified shared object or dynamically loaded library are converted to calls to the corresponding shared object or dynamically loaded library.

12. The non-transitory computer-readable medium of claim 7, the method further comprising:
emulating the specified guest platform within the host platform.

13. The non-transitory computer-readable medium of claim 12, the method further comprising:
receiving a call that requires access to a state of the emulated guest platform or to a state of the host platform; and
synchronizing, in response to the call, the state of the emulated guest platform with the state of the host platform.

14. A system comprising:
one or more processors; and
a memory comprising instructions which, when executed by the one or more processors, cause the one or more processors to implement a method, the method comprising:
receiving, at a host platform, a software program written for a specified guest platform different from the host platform, wherein the software program uses a set of shared objects or dynamically loaded libraries associated with the quest platform, and wherein the software program and the set of shared objects or dynamically loaded libraries are not compatible with the host platform;
emulating the specified guest platform within the host platform;
determining whether the host platform has a corresponding shared object or dynamically loaded library that was not binary translated from, but implements a common external interface with a specified shared object or dynamically loaded library from within the set of shared objects or dynamically loaded libraries;
if the host platform has the corresponding shared object or dynamically loaded library, using the corresponding shared object or dynamically loaded library in place of the specified shared object or dynamically loaded library for execution of the software program within the host platform by dynamically modifying links in the software program to link to the corresponding shared object or dynamically loaded library in place of the specified shared object or dynamically loaded library, avoiding a binary translation of the specified shared object or dynamically loaded library, wherein the common external interface implements similar or substantially the same function calls, and similar or substantially the same behavior in response to the function calls, as the specified shared object or dynamically loaded library; and
if the host platform lacks the corresponding shared object or dynamically loaded library, performing the binary translation of the specified shared object or dynamically loaded library for execution of the software program within the host platform.

15. The system of claim 14, wherein the set of shared objects or dynamically loaded libraries comprises at least one system library that is associated with the corresponding shared object or dynamically loaded library at the host platform and at least one vendor library that is not associated with the corresponding shared object or dynamically loaded library at the host platform.

16. The system of claim 14, wherein the specified guest platform comprises ARM hardware, and wherein the host platform comprises x86 hardware.

17. The system of claim 14, wherein using the corresponding shared object or dynamically loaded library in place of the specified shared object or dynamically loaded library for execution of the software program within the host platform comprises:
   providing a bridge so that calls to the specified shared object or dynamically loaded library are converted to calls to the corresponding shared object or dynamically loaded library.

18. The system of claim 14, the method further comprising:
   receiving a call that requires access to a state of the emulated guest platform or to a state of the host platform; and
   synchronizing, in response to the call, the state of the emulated guest platform with the state of the host platform.

* * * * *